United States Patent

Smith

Patent Number: 5,087,866
Date of Patent: Feb. 11, 1992

[54] TEMPERATURE COMPENSATING CIRCUIT FOR LVDT AND CONTROL SYSTEM

[75] Inventor: Trevor S. Smith, Sutton Coldfield, England

[73] Assignee: Lucas Industries, England

[21] Appl. No.: 704,280

[22] Filed: May 22, 1991

[51] Int. Cl.⁵ ............................................. G05B 13/00
[52] U.S. Cl. ..................................... 318/653; 318/657; 318/563; 60/261; 60/39.141; 60/39.161; 236/92 R; 364/724.09
[58] Field of Search ................................. 318/560-680; 60/261, 39.141, 39.161, 39.281; 261/67, 39.1; 123/381, 456, 494, 339; 236/92 R, 93 R, 101 C, 102; 324/176; 364/724.09

[56] References Cited

U.S. PATENT DOCUMENTS

| | | | |
|---|---|---|---|
| 4,134,065 | 1/1979 | Bauer et al. | 318/653 X |
| 4,363,098 | 12/1982 | Buus et al. | 318/563 X |
| 4,450,443 | 5/1984 | Dolland | 318/657 X |
| 4,483,425 | 11/1984 | Newman | 248/550 X |
| 4,599,560 | 7/1986 | Sanford et al. | 318/657 X |
| 4,807,516 | 2/1989 | Takats | 318/564 X |
| 4,904,921 | 2/1990 | DeVito et al. | 318/657 X |
| 4,969,662 | 11/1990 | Stuart | 280/707 |
| 4,978,865 | 12/1990 | Hartmann et al. | 318/599 X |
| 4,989,169 | 1/1991 | McCaslin et al. | 364/724.09 |
| 5,025,199 | 6/1991 | Ako | 318/561 |

Primary Examiner—Paul Ip
Attorney, Agent, or Firm—Andrus, Sceales, Starke & Sawall

[57] ABSTRACT

A linear variable displacement transducer (LVDT) has a core connected to an actuator such as a torque motor. The outputs of the LVDT are demodulated and subtracted to provide a displacement signal which is compared with a desired displacement to provide closed loop control of the torque motor. The desired displacement is formed by multiplying a demand signal by the sum of the demodulated LVDT outputs so as to provide temperature compensation.

4 Claims, 3 Drawing Sheets

TEMPERATURE COMPENSATING CIRCUIT FOR LVDT AND CONTROL SYSTEM

The present invention relates to a temperature compensating circuit for a linear variable displacement transducer (LVDT), and to a control system employing an LVDT.

It is known to use LVDTs in servo control systems, for instance employing torque motors to control fuel metering valves. One such known system employs analogue and digital parts, the analogue part providing basic control of a fuel metering valve and the digital part providing a trim to correct for errors such as flow forces, offsets, and tolerances in the various parts of the system. The LVDT comprises a transformer whose core is coupled to the metering valve such that its displacement corresponds to the degree of opening of the valve. A primary winding of the LVDT is connected to a drive oscillator for energising the LVDT with a signal at a frequency of a few kilohertz. The LVDT has two secondary windings whose coupling to the primary winding varies with displacement of the core. The amplitude of signals induced in the secondary windings is dependent on displacement of the core, and hence the degree of opening of the valve, such that the difference between amplitudes is substantially linearly proportional to the core displacement. This difference is compared with a demand signal to form an error signal which drives the torque motor so that the metering valve assumes a degree of opening corresponding to the demand signal.

The digital part adds a trim signal to the demand signal formed by integrating the difference between the demand signal and a feedback signal.

LVDTs produce output signals which are affected by temperature. Thus, in order to provide reliable and accurate control of the metering valve, effects of varying temperature must be compensated. Although the digital part is capable of providing temperature compensation, it cannot be used for an inner control loop because of the relatively large sample time which would result in instability of the control loop. Thus, the digital trim is by a slow outer loop and, if this is used for temperature compensation, substantial errors in control will occur when the demand signal varies rapidly as the digital part alters the trim relatively slowly. This effect will be described in more detail hereinafter.

It is known to provide a temperature compensating circuit for LVDT's which divides the difference between the amplitudes of first and second LVDT output signals by the sum of the amplitudes of the output signals. This provides a temperature compensated output signal representing displacement.

According to the invention, there is provided a control system for a movement transducer comprising means for receiving first and second output signals from a linear variable displacement transducer and for supplying first and second amplitude signals corresponding to the amplitudes of the first and second output signals respectively, means for energising the linear variable displacement transducer, means for producing a displacement signal by forming the difference between the first and second amplitude signals, means for forming a compensated demand signal by multiplying a demand signal by the sum of the first and second amplitude signals, and means for driving the movement transducer in accordance with the difference between the compensated demand signal and the displacement signal.

The compensated demand signal is thus temperature compensated and, although the sum of the first and second amplitude signals may be updated only relatively infrequently, this does not cause any initially large errors when large steps in position are demanded because the temperature of the LVDT normally changes only relatively slowly.

It is thus possible to provide temperature compensation for the effects of temperature on a linear variable displacement transducer which can rapidly reduce or eliminate such temperature effects without substantially affecting the stability of a control system employing the LVDT.

The movement transducer is preferably a displacement transducer and may incorporate a torque motor. The torque motor may be arranged to drive a mechanical device, such as a fuel metering valve, which in turn is connected to the linear variable displacement transducer. The driving means may include a current limiter for limiting the maximum value of current supplied to the torque motor.

The control system may include supplying means for supplying the demand signal, the supplying means comprising means for forming a quotient corresponding to the difference between the first and second amplitude signals divided by the sum of the first and second amplitude signals, means for integrating the difference between a base demand signal and the quotient to form a correction signal, and means for adding the correction signal to the base demand signal to form the demand signal. The integrating means may include limiting means.

By eliminating the need for the slow digital trim to compensate for the effects of temperature, errors such as flow forces, offsets, and tolerances can be substantially eliminated by the trim without the introduction of transient errors caused by the digital trim attempting to compensate for temperature variations, particularly when the base demand signal varies rapidly.

The present invention will be further described, by way of example, with reference to the accompanying drawings, in which.

Figure 1:
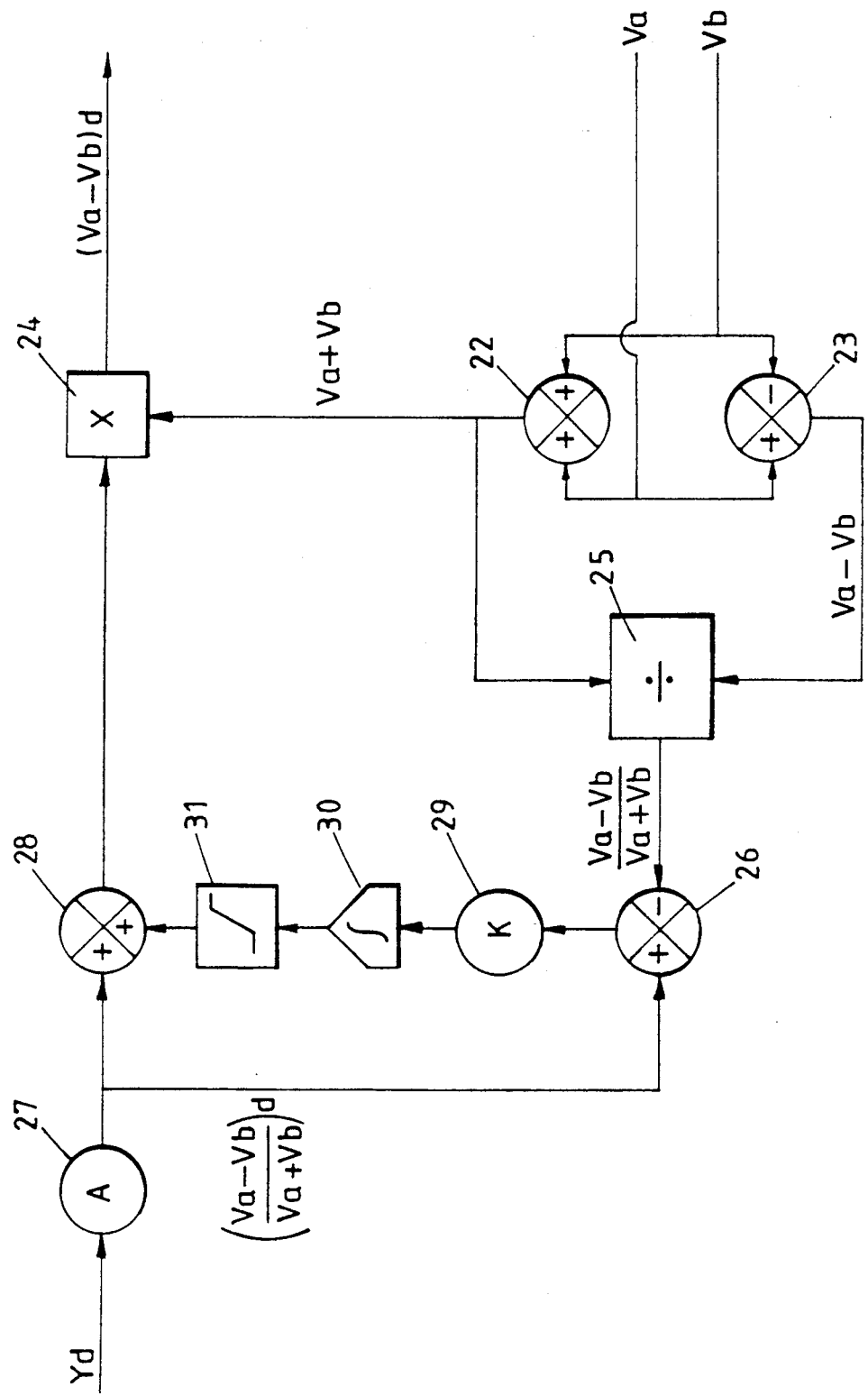
FIG. 1 is a block circuit diagram of a digital part of a control system constituting an embodiment of the invention.
Figure 2:
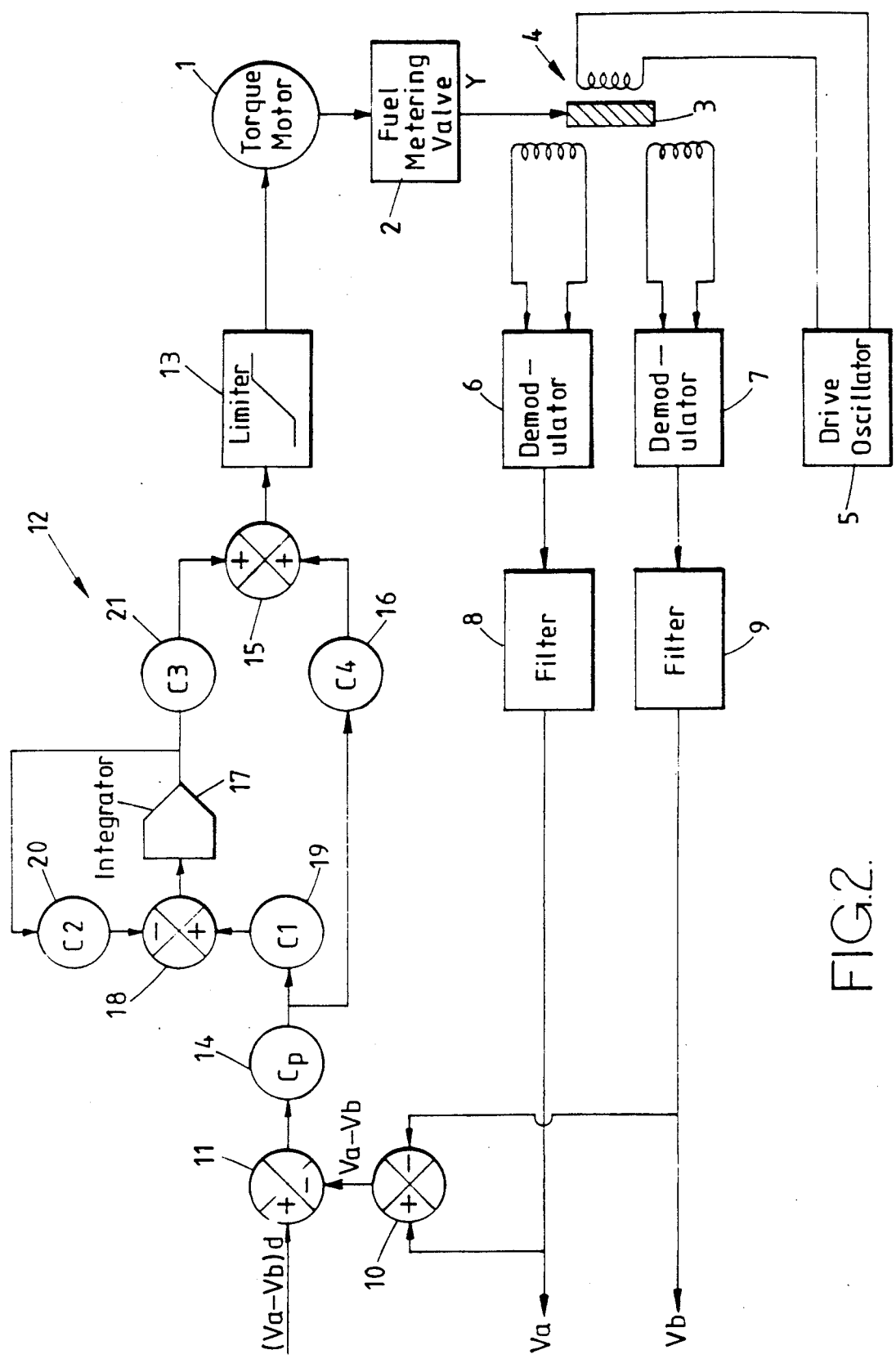
FIG. 2 is a block circuit diagram of the analogue part of the control systems.

The control system illustrated in FIGS. 1 and 2 comprises a torque motor 1 controlling a fuel metering valve 2, for instance of an aero-engine. The valve 2 is mechanically coupled to the core 3 of a linear variable displacement transducer (LVDT) such that the displacement Y of the core represents the degree of opening of the valve 2.

The LVDT 4 has a primary winding connected to a drive oscillator 5 which energises the LVDT, for instance with a sine wave at a frequency of several kilohertz. The LVDT has two symmetrically arranged secondary windings which are connected to demodulators 6 and 7 for envelope-demodulating the signals from the secondary windings The outputs of the demodulators 6 and 7 are supplied to low pass filters 8 and 9, respectively, whose outputs produce signals Va and Vb, respectively, which represent the amplitude of signals induced in the secondary windings of the LVDT, and hence represent displacement of the core 3.

A subtracter 10 forms the difference Va−Vb between the amplitude signals and supplies this to the negative input of a subtracter 11 whose positive input receives a demand signal $(Va-Vb)_d$. The difference or error signal produced by the subtracter 11 is used to drive the torque motor 1 via a compensating circuit 12 and a current limiting circuit 13 for limiting the maximum positive and negative currents supplied to the torque motor. The compensating circuit 12 receives the error signal via a "multiplier" 14, formed by an attenuator or an amplifier, for multiplying the signal by a constant Cp. The compensating circuit includes a summer 15 which receives the error signal via a multiplier 16 which multiplies the signal by a constant C4 and an integrated error signal from an integrating loop formed by an integrator 17, a subtracter 18, and multipliers 19, 20, and 21 which are arranged to multiply by constants C1, C2, and C3, respectively. The integrator 17 integrates the difference between the error signal multiplied by the constant C1 and its own output multiplied by the constant C2 and supplies this to the summer 15 via the multiplier 21 which multiplies by the constant C3.

The electronic elements of the control circuit shown in FIG. 2 are embodied as analogue circuits and behave as a substantially conventional servo control system for producing a displacement Y in the LVDT 4 which corresponds to the demand signal $(Va-Vb)_d$. The part of the control system shown in FIG. 1, on the other hand, is embodied as a digital circuit and performs the functions of trimming and temperature compensation. The amplitude signals Va and Vb are supplied to a summer 22 and to the positive and negative inputs, respectively, of a subtracter 23. The sum signal Va+Vb from the summer 22 is supplied to first inputs of a multiplier 24 and a divider 25 whereas the difference signal Va−Vb from the subtracter 23 is supplied to the second input of the divider 25. The divider 25 produces a quotient signal corresponding to (Va−Vb)/(Va+Vb) and this is supplied to the negative input of a subtracter 26.

A base demand signal $Y_d$ is supplied to a multiplier 27 which multiplies this signal by a constant A to form a signal $((Va-Vb)/(Va+Vb))_d$ which is supplied to the positive input of the subtracter 26 and to a first input of a summer 28. The output of the subtracter 26 is supplied via a multiplier 29, which multiplies by a constant K, to an integrator 30 whose output is limited by a limiter 31. In practice, the limiter 31 acts on the integrator 30 so as to prevent its output from exceeding maximum positive and negative limits. The limited integral is supplied to the second input of the summer 28.

The output of the summer 28 is supplied to a second input of the multiplier 24, whose output is the demand signal $(Va-Vb)_d$ which is supplied to the subtracter 11.

Figure 3:
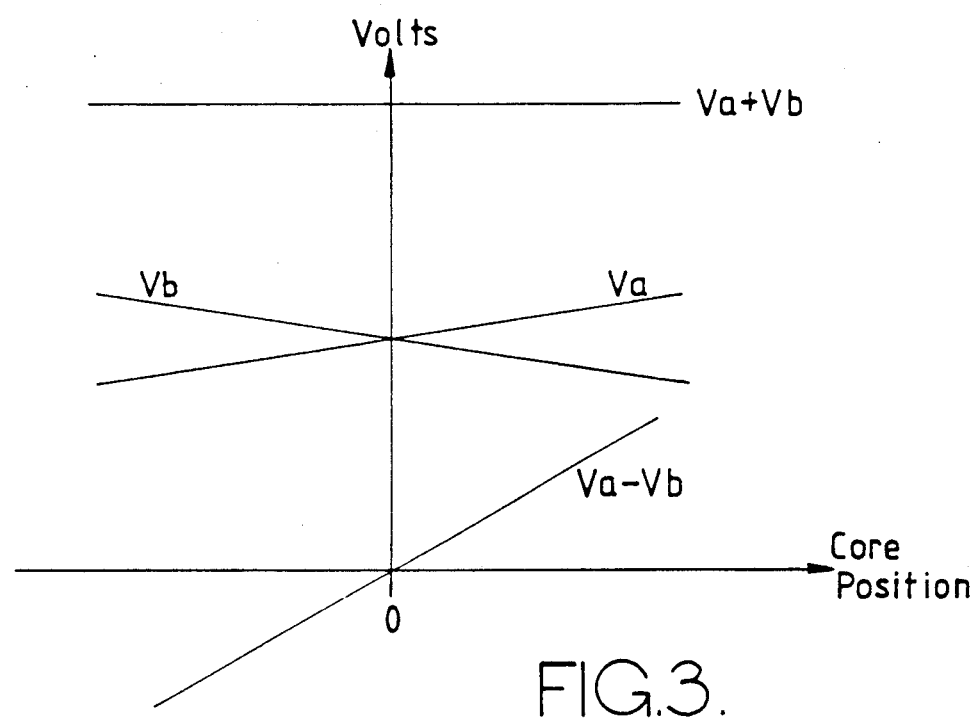
FIG. 3 is a graph of voltage against displacement illustrating operation of the system shown in FIGS. 1 and 2.

FIG. 3 illustrates the effective transfer function of the LVDT 4 for a given constant temperature. The amplitude signals Va and Vb are linear functions of opposite slope of displacement of the core 3 and, within manufacturing tolerances, are substantially symmetrical with respect to each other. To a very close approximation and substantially irrespective of tolerances, the null core position or zero displacement position where the amplitude signals Va and Vb cross is constant and is not effected by temperature. The sum Va+Vb of the amplitude signals for a given constant temperature is substantially constant The difference signal Va−Vb is, to a good approximation, a linear function (with positive slope) of core position.

Figure 4:
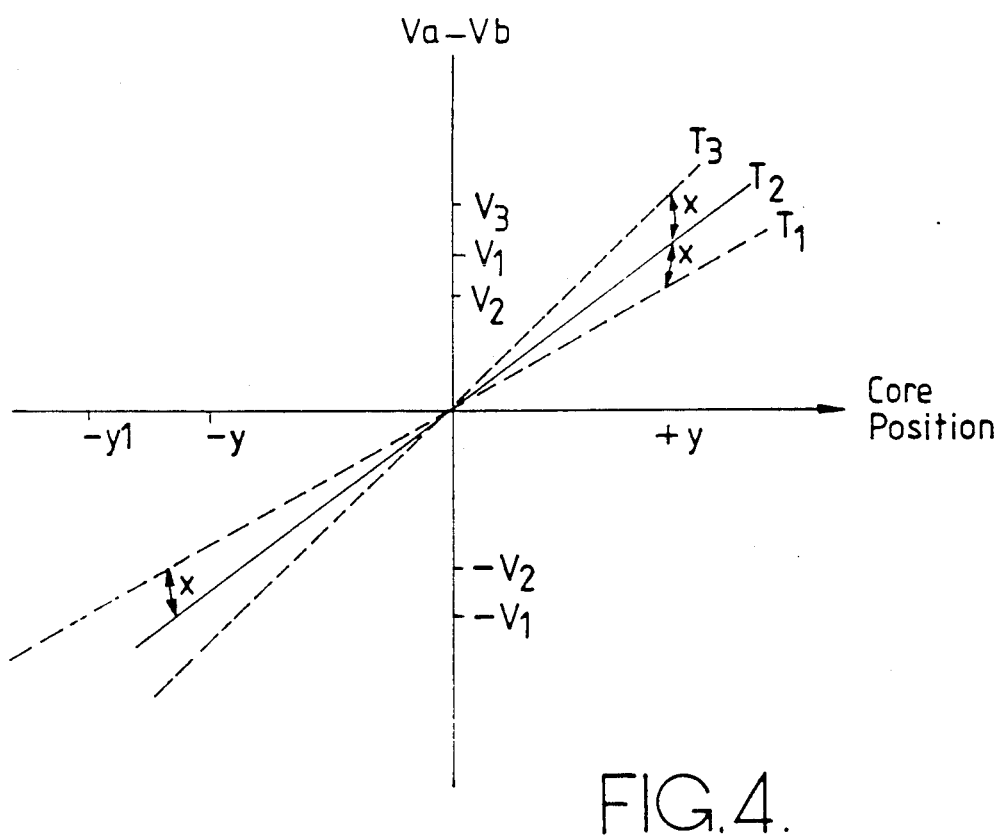
FIG. 4 is a graph of voltage against displacement illustrating the effects of temperature variations on an LVDT.

The effects of varying temperature are such as to alter the slopes of the amplitude signals Va and Vb, the absolute value of the slopes of these curves increasing with increasing temperature. The effects of this are illustrated in FIG. 4 for the difference signal, the curve represented by a continuous line corresponding to a nominal working temperature T2, the broken line corresponding to a lower temperature T1 and the chain dot line corresponding to a higher temperature T3. Thus, the effects of temperature alter the transfer function of the LVDT 4 and require compensation in order to ensure accurate control of fuelling by the metering valve 2.

Although not apparent from FIG. 4, which deals with the difference signal Va−Vb, variations in temperature also affect the voltage at which the curves Va and Vb cross the zero displacement axis. Thus, as temperature increases, this crossing point occurs at higher voltages. The sum signal Va+Vb therefore also increases with increasing temperature.

It has been found that the effects of varying temperature can be removed or at least substantially reduced by using the quotient (Va−Vb)/(Va+Vb) as the LVDT output representing displacement Y of the core 3. In particular, the effects of temperature variation on the outputs from the LVDT are such as to make similar contributions to the numerator and denominator of the quotient and these effects cancel each other to a good approximation so that the quotient provides a substantially temperature-compensated representation of displacement Y.

As shown in FIG. 1, the feedback loop including the integrator 30 receives the temperature-compensated displacement signal and compares this with the scaled demand signal, so that the trim provided by this part of the control system is independent of temperature. Temperature compensation of the servo-control system is performed in the multiplier 24, which multiplies the trimmed and scaled demand signal $((Va-Vb)/(Va+Vb))_d$ by the temperature-dependent sum Va+Vb so that the demand signal $(Va-Vb)_d$ varies with temperature in such a way that the final control of displacement of the core 3, and hence of opening of the metering valve 2, is substantially independent of temperature.

FIG. 4 illustrates the improvement achieved by eliminating the effects of temperature from the part of the control circuit including the integrator 30. If the multiplier 24 were not included, then a difference signal would still have to be used for the analogue part but such a difference signal would not be temperature-compensated. The output of the summer 26 would thus contain an error signal for which the integrator 30 would attempt to compensate. If a position −Y were demanded, then the demand signal to the analog part would initially be −V1. If the LVDT were actually at temperature T1, this would initially result in a position −Y1 being achieved. The integrator 30 would sense this error and integrate so as to correct the demand signal to −V2 by adding x to the original demand signal −V1.

If a displacement to +Y were then demanded, the initial new demand signal to the analog part would be $V_3 = V_1 + x$. However, because the LVDT is actually at temperature T1, the demand signal corresponding to +Y is V2=V1−x. There would thus be an initial error after the step change of 2x, which the integrator would slowly correct by adding −x to the demand V1.

The arrangement shown in FIG. 1 overcomes this problem by removing the effects of temperature variation from the integral control loop and providing a separate temperature compensation loop for the demand signal. The temperature compensation can therefore be provided extremely rapidly but without significantly affecting the stability of the control system. The control system can therefore follow rapidly changing demand signals irrespective of temperature variations affecting the LVDT.

Although the control system has been described for use in controlling fuelling of an aero-engine, it may be used in any control application where an LVDT is used as a position sensor.

I claim:

1. A control system for a movement transducer, comprising: demodulating means for receiving first and second output signals from a linear variable displacement transducer and for supplying first and second amplitude signals corresponding to amplitudes of the first and second output signals, respectively; means for energising the linear variable displacement transducer; displacement signal producing means responsive to said demodulating means for producing a displacement signal by forming a difference between the first and second amplitude signals; signal forming means responsive to said demodulating means for forming a compensated demand signal by multiplying a demand signal by a sum of the first and second amplitude signals; and driving means responsive to said signal forming means and said displacement signal producing means for driving the movement transducer in accordance with a difference between the compensated demand signal and the displacement signal.

2. A system as claimed in claim 1, in which said driving means includes first limiting means for limiting drive to the movement transducer.

3. A system as claimed in claim 1, further comprising supplying means for supplying the demand signal to said signal forming means, said supplying means comprising quotient forming means for forming a quotient as the difference between the first and second amplitude signals divided by the sum of the first and second amplitude signals; integrating means responsive to said quotient forming means for integrating a difference between a base demand signal and the quotient to form a correction signal, and adding means responsive to said integrating means for adding the correction signal to the base demand signal to form the demand signal.

4. A system as claimed in claim 3, in which said integrating means includes second limiting means.

* * * * *